United States Patent

Soughan

[11] Patent Number: 6,004,593
[45] Date of Patent: Dec. 21, 1999

[54] COFFEE FLAVORING METHOD

[76] Inventor: John J. Soughan, 33 E. Orange St., Chagrin Falls, Ohio 44022

[21] Appl. No.: 09/213,553

[22] Filed: Dec. 17, 1998

Related U.S. Application Data

[63] Continuation-in-part of application No. 08/796,722, Mar. 3, 1997, abandoned.

[51] Int. Cl.⁶ .............................. B65B 29/02; A23F 5/00
[52] U.S. Cl. .............................. 426/78; 426/79; 426/82; 426/84; 426/433; 426/595
[58] Field of Search .................................. 426/417, 487, 426/488, 506, 433, 77–79, 82, 84

[56] References Cited

U.S. PATENT DOCUMENTS

| 2,330,884 | 10/1943 | Harriman . |
| 2,835,587 | 5/1958 | Maggiore . |
| 2,926,088 | 2/1960 | Spiselman . |
| 3,006,764 | 10/1961 | Stephenson, et al. . |
| 3,126,284 | 3/1964 | Howerin . |
| 3,607,297 | 9/1971 | Fasano, et al. . |
| 3,689,291 | 9/1972 | Draper . |
| 4,612,942 | 9/1986 | Dobberstein, et al. . |
| 5,043,172 | 8/1991 | Loizzi . |
| 5,192,571 | 3/1993 | Levy . |
| 5,518,743 | 5/1996 | Pergola, et al. . |
| 5,567,461 | 10/1996 | R. Lehrer . |

FOREIGN PATENT DOCUMENTS

| 3612227 | 11/1986 | Germany . |
| 888351 | 1/1962 | United Kingdom . |

*Primary Examiner*—Anthony J. Weier
*Attorney, Agent, or Firm*—Pearne, Gordon, McCoy & Granger LLP

[57] ABSTRACT

Coffee of a generic flavor coming from the natural coffee bean is brewed and custom flavored in a method having the steps of (1) brewing the coffee in a brew chamber and passing the coffee through a filter to produce filtered filtrate of the brewed coffee at the downstream side of the filter, and (2) exposing a flavoring agent to the filtered filtrate at said downstream side of the filter to thereby add flavor associated with the flavoring agent to the filtered filtrate. The steps of producing filtered filtrate and adding flavor thereto are substantially separate and sequential as to each increment of filtered filtrate so produced and to which the flavoring agent is so exposed.

7 Claims, 1 Drawing Sheet

COFFEE FLAVORING METHOD

RELATED APPLICATION

This application is a continuation-in-part of application Ser. No. 08/796,722 filed Mar. 3, 1997, now abandoned.

This invention relates to a method for making coffee by the filter drip process, and particularly to a method for imparting flavoring to commercial ground coffee, regular or decaffeinated, in an improved manner.

BACKGROUND OF THE INVENTION

"The background of the invention" as set out in Pergola et al. U.S. Pat. No. 5,518,743 is also applicable to the present invention and is incorporated by reference as if fully repeated herein, with the following exception: Such background discussion in Pergola et al. concludes with the statement that there is a need to provide the consumer with coffee of a variety of flavors through the use of a predetermined flavored filter. In light of the present invention, such need is better expressed as a need for a predetermined filtering package wherein both filtering and flavoring functions are performed, rather than expressing it as a need for a predetermined flavored filter as such.

As disclosed in Pergola, a flavoring agent is used to change the flavor which would otherwise be imparted by what may be inexpensive coffee. The flavoring agent thereby provides one of an assortment of flavors such as those listed in Pergola at column 7, such listing being incorporated by reference as if fully repeated herein. The coffee's flavor in the absence of the flavoring agent may be referred to as the generic flavor. This is the flavor of the natural brewed coffee. A changed coffee flavor resulting from the presence of a flavoring agent may be referred to as a custom flavor, and the flavoring agent as a custom flavoring; custom flavor or custom flavoring connotes the addition of one or more natural or manufactured flavoring agents. The concept of custom flavoring of a coffee of generic flavor is also disclosed in Loizzi U.S. Pat. No. 5,043,172.

Additional background context is helpful to a ready understanding of the significance of the present invention: The consensus among coffee testers, evolved over many years, is that the best tasting coffee requires not only properly roasted and ground beans, but also entails proper use of water and other proper procedures. Good water, i.e., not chlorinated and not mineral laden, is of particular importance.

Among the proper procedures are proper brewing temperature (typically 195 to 205 degrees F.) to which the coffee beans are exposed for optimum extraction. Too high a temperature leads to extraction of some of the astringent components of the bean, and too low a temperature leads to under extraction resulting in a bland coffee.

Another procedure affecting coffee quality is the filter, which performs three functions. The first is to act as a container to hold the coffee grounds. The second is to act as a "throttle" to control the flow rate. If the flow rate is too high, the coffee is given too short an exposure or steeping time resulting in bland coffee. If, on the other hand, the porosity is too low so that the flow rate is too low, the steeping time becomes too long, producing over-extraction resulting in a harsh, bitter coffee. The third function of the filter is to produce a filtrate by removing or filtering out particulates and other ingredients from the coffee brew.

BRIEF DESCRIPTION OF THE INVENTION

The present invention embodies the novel concept of accomplishing the custom flavoring of a brew of coffee of generic flavor in such a way as to not interfere with the complex processes taking place in the brew basket in connection with the brewing step and the extraction of the desirable qualities of the ground coffee. Interjecting flavoring material into the brewing and filtering process in the manner disclosed by Pergola or Loizzi can disrupt the steeping process by "competing" and interfering with the processes of brewing and extraction from the ground coffee, and can also disrupt the filter's flow-through properties, as more fully discussed in the following detailed description of the present invention.

The present invention is a better way of custom flavoring coffee by flavoring the filtrate of coffee of generic flavor in a separate and sequential manner. Benefits include a superior flavor, a more consistent or better standardized flavor, an economical way of brewing custom flavored coffees of high quality, and, in general, delivery of better value in a user-friendly manner.

In the present invention, a conventional coffee filter is replaced by a filter-cum-flavoring package, by which is meant a package containing a flavoring and in which a paper filter forms a wall. The filter-formed wall is the upstream wall of the package. When used in a conventional filter drip or automatic filter drip brewer, the result is a brewing system wherein the producing of a filtered filtrate of the coffee brew and the flavoring of the filtrate are performed as two separate and sequential steps. An advantage of this sequence as compared to simultaneous filtering and flavoring is greater uniformity, efficiency and consistency in flavoring results.

DETAILED DESCRIPTION OF THE INVENTION

Figure 1:
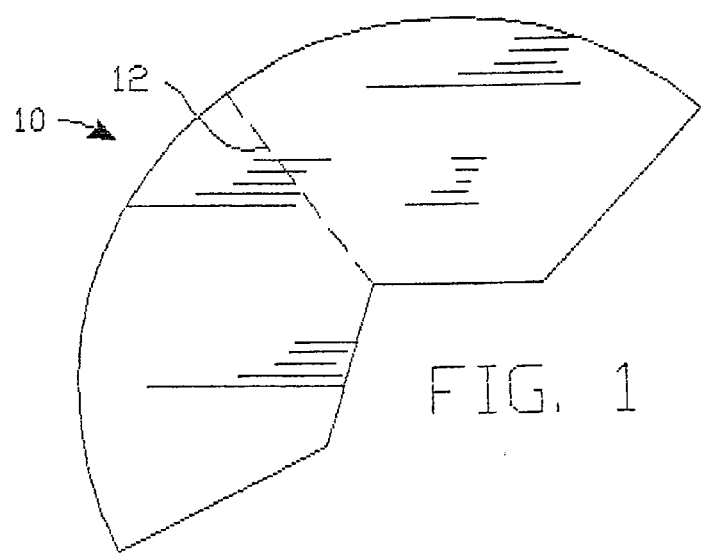
FIG. 1 is a plan view of a blank cut from a multilayered web and adapted to be formed into a filter-cum-flavoring package according to one example of the invention.

As mentioned above, in the present invention, a conventional coffee filter is replaced by a filter-cum-flavoring package by which is meant a package containing a flavoring and in which a paper filter forms a wall. The overall form of the package may be similar to that of a conventional coffee filter of either a conventional cone shape similar to that shown in Pergola in FIG. 1 or a conventional basket shape similar to that shown in Pergola in FIG. 2 or in Loizzi, so that the package can replace a conventional filter in a brewing basket. The package may be of a shallow multiple-layered construction of either the cone shape or the basket shape, with the top layer comprising a filter and the flavoring being carried in a layer separate from and below the top layer, or contained between the top layer and a lower layer.

The flavoring may be directly or indirectly supported on or in association with the inside or downstream face of the filter, provided that the filter is not clogged by the flavoring or by the indirect support for the flavoring. Direct support of the flavoring on the downstream side of the filter, although contemplated, may be difficult to accomplish without clogging of the filter paper. Indirect support of the flavoring on the filter may be by use of a layer of woven or unwoven fabric or scrim or large-pore paper or other support-web element fixed on or next to the underside or downstream side of the filter paper in supporting relationship with the flavoring and designed to allow the brewed coffee to complete its passage through the filter and form a filtered filtrate of the brewed coffee in an unimpeded manner. In particular, such layer or support web may consist of a second layer of filter paper, but one impregnated with flavoring agent as disclosed aforesaid Pergola et al. U.S. Pat. No. 5,518,743, the disclosure of which is incorporated by reference as if fully repeated herein.

Instead of or in addition to supporting the custom flavoring directly or indirectly on or in association with the inside or downstream face of the filter of the filter-cum-flavoring package, or using the bottom wall or layer of the package to support or carry the flavoring, the flavoring may be contained between such two outer walls or layers of the package. For example, the flavoring in particulate form may be laid down on non-marginal portions of the bottom layer before the top layer (filter) and bottom layer are overlaid and joined, such joining (not shown) being only at or principally at the marginal portions of the layers (the portions of their areas that are adjacent to and extend along the entire perimeter of the blank into which such layers are die cut or otherwise cut to shape), such joining occurring either before or after the forming of the blank, so that when the layers are joined an internal chamber is formed between the top and bottom layers with the flavoring contained therein. For example, the blank referred to may be similar in plan view to the blank 10 described below in connection with a specific embodiment of the invention and shown in FIG. 1.

The custom flavoring may be contained in a fibrous "insert" of the kinds disclosed in Loizzi U.S. Pat. No. 5,043,172, such disclosure of the use of a flavoring agent being incorporated by reference as if fully repeated herein, with the difference that such insert would be contained within the filter-cum-flavoring package of the present invention so that such insert would be located on the downstream side of the filter, rather than upstream thereof as in Loizzi. Or, such "insert" might itself form the second (downstream) wall of the filter-cum-flavoring package. Such insert may be shaped similarly to the filter. It may be located immediately adjacent the downstream side of the filter so that the filter-cum-flavoring package consists of double-wall construction with no internal chamber or layer between the walls, with the filter on the upstream side and the "insert" on the downstream side of the package, or the "insert" may be spaced from the downstream side of the filter. The insert and the other layers may have one of the various shapes disclosed in Loizzi, or other shapes.

The custom flavoring may comprise flavoring solids or oils that may be encapsulated, granulated, powdered, or in gel form, and may be one of the flavoring agents disclosed in Loizzi or one of the preselected essential oils disclosed in Pergola et al., or any other suitable flavoring. The custom flavoring may be freeze-dried.

In the practice of the invention from a method standpoint, generically flavored coffee may be brewed and custom flavored in a standard brewing machine in the following manner: A brew of the coffee is formed by brewing the coffee in a brew chamber. The brewed coffee is then flowed through a permeable filter web or filter proper to produce filtrate of the brewed coffee at the downstream side of the filter web. The filtrate is then flowed past custom flavoring located downstream of the filter web to thereby add custom flavoring to the filtrate.

Arbitrarily small individual increments of the flowing materials can be considered in analyzing the flows. In such flowing of the brewed coffee through a filter web to produce filtrate of the brewed coffee, increments of the brewed coffee are flowed through the filter web to produce, downstream of the filter web, corresponding increments of filtrate of the brewed coffee. In such flowing of filtrate past custom flavoring, said increments of filtrate are flowed past custom flavoring located downstream of the filter web to thereby add custom flavoring to said increments of filtrate. The steps of (a) producing said increments of filtrate and (b) flowing said increments past custom flavoring to add custom flavoring to said increments are substantially separate and sequential as to each of said increments of filtrate (although for the most part occurring simultaneously as to different ones of said increments).

An advantage of this sequence as compared to simultaneous filtering and flavoring of each increment of filtrate is greater uniformity and consistency in custom flavoring results. The amount of coffee solids removed by a filter proper can vary from locality to locality across the area of the paper itself, depending on variations in porosity of the paper, and depending also, or alternatively, on variations in density of solids content in different increments of the coffee brew volume (clumping) and consequent variations in the density of removed solids at various increments of the filter area. These conditions can result in substantial variance in rates of through-put of the brew at different local areas of the filter paper. When the same filter paper is impregnated with custom flavoring, such conditions tend to be exacerbated, and variations in local through-put can thin out or use up the custom flavoring at local areas of relatively high through-put, and to a degree cause fluid by-pass around areas of partially blocked or low through-put, whereby the high flow areas are starved for custom flavoring but produce a relatively high proportion of the total through-put, thereby underflavoring it to an extent. Because of these effects, the degree of custom flavoring can vary from brew to brew, thus undesirably making the custom flavoring results more uncertain than otherwise for any given brew. This effect can be avoided or minimized with the present invention, thus providing greater uniformity and consistency in custom flavoring results. Thus the present invention provides an improvement in the concept of modifying the generic flavoring of a brewed coffee to produce a preselected one of a variety of custom flavors. The consumer may purchase a relatively inexpensive generically flavored coffee and, using a filter-cum-flavoring package of the desired custom flavor in place of a conventional coffee filter when brewing that generically flavored coffee, may obtain custom-flavored coffee of the desired selection in a uniform and consistent manner. The invention contemplates that the filter-cum-flavoring packages of the invention may be sold in assorted collections or in collections of the same custom flavor, and that such collections themselves may be packaged along with a relatively inexpensive generically flavored coffee. An alternative is to package and sell such assorted or uniform collections separately from any generic coffee, allowing the consumer to use them with any generically flavored coffee available to the consumer.

Such improvement in uniformity and consistency of custom flavoring results can be enhanced in many instances by providing the filter-cum-flavoring package of the invention with an internal diffusing space, thus allowing the varying throughputs of filtered filtrate passing from the filter proper at different local areas to diffuse to a greater or lesser degree before the custom flavoring is exposed to the filtrate, thereby in turn providing a more even distribution of throughput rates at the incoming side of the layer in which the custom flavoring is exposed to the filtrate.

Figure 2:
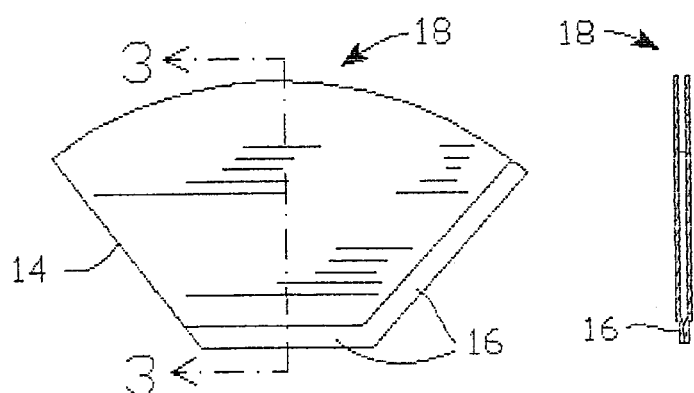
FIG. 2 is a filter-bag-shaped package formed and constructed by folding and marginally fastening the blank of FIG. 1.
Figures 3, 4:
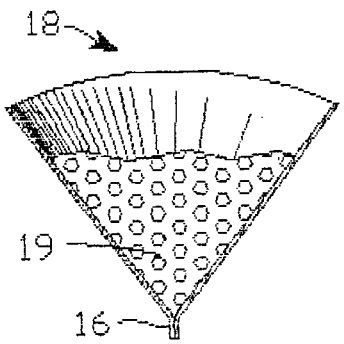
FIG. 3 is a cross-section taken on line 3—3 of FIG. 2, and on the same scale as FIGS. 1 and 2, such scale being too small a scale to show the individual layers of the package.
FIG. 4 is on the same scale as FIGS. 1–3, and shows the package of FIG. 3 after its mouth has been spread open for receiving coffee grounds when or after the package is placed in the brew basket of a conventional manual or automatic filter drip machine.

In the particular example of the invention shown in the drawings, a filter-cum-flavoring package is generally shaped similarly to a conventional cone-shaped filter, but it will be understood that other overall shapes for the package can be used, such as that of a conventional basked-shaped filter. The shaped package is provided in three-layer form. In the particular example illustrated, web stock comprising all three layers is cut into a blank 10 formed similarly to a conventional paper web used as a cone-shaped filter in a filter drip brewer. This form is then folded around fold line 12 to form the corresponding closed edge 14 in FIG. 2. The side edges other than the rim are then joined by interlocking embossments or the like in fastening zones 16 in the manner of conventional cone-shaped paper filters to complete formation of the filter-cum-flavoring package 18 as seen in FIGS. 2 and 3, much as a conventional piece of filter paper is formed so that when the package 18 is expanded or opened to receive ground coffee 19, as seen in FIG. 4, the filter is then shaped to be more or less congruently received in a brew basket.

Figure 5:
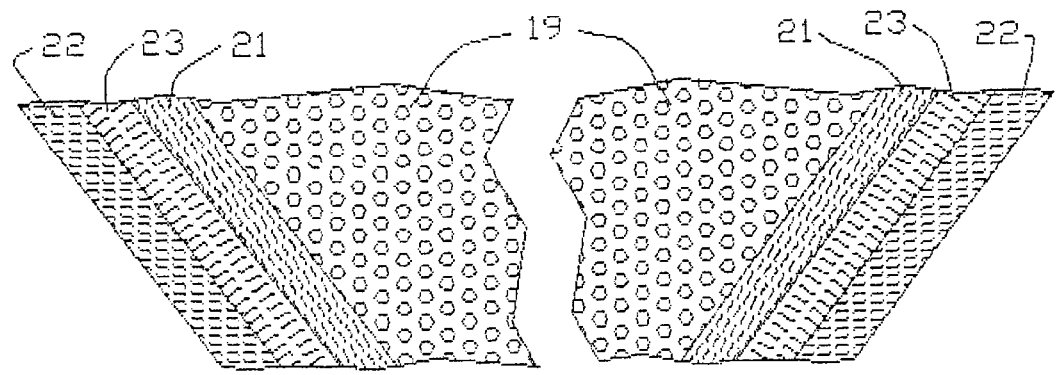
FIG. 5 is a fragmentary cross-sectional view of portions of a lower part of FIG. 5 on an enlarged scale, and showing the three layers of which the filter-cum-flavoring package in the illustrated example of the invention consists.

In the particular package shown in the drawings, a third, diffusing layer is provided in addition to a filter paper layer and a custom-flavor-carrying layer. The three separate layers 21, 22 and 23 of this package are seen in FIG. 5. The top layer 21 comprises the filter paper proper. The bottom flavor-carrying layer 22 may comprise a second web of filter paper impregnated with a flavoring agent, such as described in Pergola et al., but located below or downstream of the filter proper 21 in the present invention. Or, the custom-flavor-carrying layer 22 may comprise a fibrous "insert" of the kinds disclosed in Loizzi, such insert being located on the downstream side of the filter, rather than upstream thereof as in Loizzi. The fibrous material of the insert is selected to be sufficiently flexible to allow folding of the blank 10 into the filter-cum-flavoring package 18. The layer 22 preferably has a greater porosity than the filter paper layer 21.

Another advantage of the invention is that, unlike prior systems such as Pergola, it avoids any reliance on the layer that is doing the filtering to also add the custom flavoring. Custom flavoring in the form of coffee oils or essences can be absorbed by the fibers of the paper filter—a blotting effect that can degrade the flavoring action. On the other hand, as with the present invention, when the filter itself is not relied on to carry the custom flavoring, but another layer below the filter does so, such other layer, such as the layer 22 in the particular example illustrated, can be selected to be non-absorbent of or less absorbent of coffee oils and essences or other custom flavorings than the filter layer would be (the filter layer 21 in the particular example illustrated), thus eliminating or minimizing the blotting effect referred to. This further contributes to uniformity and consistency in flavoring results achieved by the invention.

In the illustrated example, the middle or third layer 23 is provided in the form of a mesh, woven or unwoven fabric, paper or scrim to provide a diffusion space or zone for the filtered but not yet custom flavored filtrate leaving the inner side of the filter paper layer 21, thereby improving uniformity and consistency in custom flavoring results, as previously mentioned. The openness or porosity of this diffusion layer 23 is preferably very high as compared to that of the flavor-carrying layer 22, which in turn is preferably higher than that of the layer 21 of filter paper proper.

Whether or not a diffusion layer such as the layer 23 is used, it is preferable that any web layer (such as the layer 22 for example) that is below the filter paper proper (the layer 21 for example) be more permeable or porous and have a higher flow rate capacity than the filter paper proper. This assures that backup of filtrate into the brew basket will be avoided and thereby further assures separation of the brewing and filtering process from the flavoring process. The layer 22 may act as a containing wall for the flavoring without interfering with the smooth, backup-free flow of filtrate through the system.

As stated earlier above, the custom flavoring in particulate form may be laid down or sprayed or otherwise deposited on non-marginal portions of the bottom layer (e.g., layer 22) on the upstream side of such layer and before the top layer (e.g., filter 21) and bottom layer are overlaid and joined, such joining being only or principally at their then-existing or then-about-to-exist marginal portions either by interlocking embossments, adhesive, or other known means, and such joining at marginal portions occurring either before or after such layers are die cut or otherwise cut to shape, so that when the layers are joined an internal chamber is formed between the top and bottom layers with the flavoring contained therein. Such internal chamber can be visualized as a flavoring-containing interval of thickness entirely replacing the layer 23 illustrated in FIG. 5, or merging into or permeating the illustrated layer 23. If the layer 23 is omitted to be replaced in its entirety by a flavoring-containing interval of thickness, the measure of such flavoring-containing interval of thickness may be zero where marginal portions of the top and bottom layers are joined directly to each other, but will have small positive values, say fractions of a millimeter, in many other regions, and may tend to be largest in regions associated with what becomes the bottomward portion of the filter-cum-flavoring package when it is deployed in a brew basket, reflecting a tendency of the particulate flavoring to settle towards the bottom of the deployed package.

Instead of being deposited on the upstream side of the bottom layer, the flavoring may be deposited on non-marginal portions of the downstream side of the top (or filter) layer before the top and bottom layers are overlaid and joined.

In cases where the custom flavoring is impregnated into or otherwise affixed in or on a supporting layer, settling of the flavoring toward the bottom of the deployed filter-cum-flavoring package may not occur.

Implicit in the foregoing is that the top and bottom layers of the filter-cum-flavoring package each extend throughout a continuous area and are permeable and free of pockets or interruptions throughout such area, similarly to the conventional paper filters which the filter-cum-flavoring packages of the present invention replace.

From a method aspect, the invention may not use the filter-cum-flavoring packages described above but may instead perform the method by inserting a custom-flavor-impregnated paper such as shown in Pergola et al. or an insert such as shown in Loizzi, or similar flavor carrier layer, immediately below or on the downstream side of a fine-mesh, permanent-type, metal or plastic filter or the like, or preferably in slightly spaced relationship therewith to provide a diffusing space between the permanent-type filter and the carrier for the custom flavoring. However, it is presently preferred to practice the method of the invention through the use of one of the filter-cum-flavoring packages discussed earlier herein.

This disclosure is by way of example, and various other changes may be made by adding, modifying or eliminating details without departing from the fair scope of the teaching contained in this disclosure. The invention therefore is not limited to particular details of this disclosure except to the extent that the following claims are necessarily so limited.

What is claimed is:

1. The method of brewing and flavoring coffee comprising the steps of (1) forming a filtered filtrate of a brew of the coffee by brewing the coffee in a brew chamber to produce a brewed coffee of generic flavor, that is, of the flavor of the natural brewed coffee, and unidirectionally passing said brewed coffee of generic flavor through a permeable filter web of a given flow rate capacity to produce filtered filtrate of said brewed coffee at the downstream side of said filter web, and (2) exposing custom flavoring to said filtered filtrate at said downstream side of said filter web to thereby add said custom flavoring to said filtered filtrate to produce a custom flavored coffee, said steps of producing filtered filtrate of the coffee of generic flavor and adding custom flavoring to the filtered filtrate being substantially separate and sequential as to each increment of filtered filtrate so produced and to which said custom flavoring is so exposed, said steps being performed while maintaining said filtered filtrate and custom flavored coffee free of restriction, downstream of said permeable filter web, by any flow rate capacity that is not higher than said given flow rate capacity whereby avoidance of backup of filtrate is assured.

2. The method of claim 1 including the step of supporting said custom flavoring on a second permeable web downstream of said permeable filter web whereby said brewed coffee of generic flavor sequentially passes through said filter web for filtering and then through said second web for custom flavoring.

3. The method of claim 1 including the step of diffusing said filtrate of coffee of generic flavor as it leaves said filter web and approaches said custom flavoring.

4. The method of claim 1 including the step of supporting said custom flavoring on the downstream face of said filter web whereby said brewed coffee of generic flavor passes sequentially through said filter web for filtering and then immediately past said custom flavoring to be custom flavored thereby.

5. The method of claim 1 including the step of containing said custom flavoring between said filter web and a second permeable web downstream of said filter web whereby said brewed coffee passes sequentially through said filter web for filtering, then past said custom flavoring to be custom flavored thereby, and then through said second web.

6. A method as in claim 5, said second web having a higher permeability and flow-rate-capacity than said filter web.

7. The method of brewing and custom flavoring generically flavored coffee comprising the steps of brewing the coffee in a brew chamber, unidirectionally flowing increments of the brewed coffee through a permeable filter web to produce, downstream of the filter web, corresponding increments of filtrate of the brewed coffee, and flowing said increments of filtrate past custom flavoring located downstream of the filter web to thereby add custom flavoring to said increments of filtrate to produce increments of custom flavored coffee, said steps of producing increments of filtrate and adding custom flavoring to said increments being substantially separate and sequential as to each increment of filtrate, said steps being performed while maintaining said filtered filtrate and custom flavored coffee free of restriction, downstream of said permeable filter web, by any flow rate capacity that is not higher than said given flow rate capacity whereby avoidance of backup of filtrate is assured.

\* \* \* \* \*